(12) United States Patent
Block et al.

(10) Patent No.: US 9,039,821 B2
(45) Date of Patent: May 26, 2015

(54) METHODS AND COMPOSITIONS FOR COATING ALUMINUM SUBSTRATES

(71) Applicant: BIRCHWOOD LABORATORIES, INC., Eden Prairie, MN (US)

(72) Inventors: William V. Block, Apple Valley, MN (US); David J. Halverson, Greenfield, MN (US); John T. Nguyen, Minnetonka, MN (US)

(73) Assignee: BIRCHWOOD LABORATORIES LLC, Eden Prairie, MN (US)

( * ) Notice: Subject to any disclaimer, the term of this patent is extended or adjusted under 35 U.S.C. 154(b) by 0 days.

(21) Appl. No.: 14/193,997

(22) Filed: Feb. 28, 2014

(65) Prior Publication Data

US 2014/0190368 A1 Jul. 10, 2014

Related U.S. Application Data

(62) Division of application No. 12/436,606, filed on May 6, 2009, now Pat. No. 8,691,346.

(60) Provisional application No. 61/051,922, filed on May 9, 2008.

(51) Int. Cl.
*C09D 1/00* (2006.01)
*C09D 5/08* (2006.01)
(Continued)

(52) U.S. Cl.
CPC . *C09D 1/00* (2013.01); *C23C 22/68* (2013.01); *C23C 22/78* (2013.01)

(58) Field of Classification Search
CPC ............ C09D 1/00; C09D 5/08; C23C 22/68; C23C 22/78

USPC ............ 106/1.17, 14.13, 14.14, 14.21, 14.44; 148/273, 275

See application file for complete search history.

(56) References Cited

U.S. PATENT DOCUMENTS 2,303,350 A 12/1942 Fuller
2,554,256 A 5/1951 Lewis et al.
(Continued)

FOREIGN PATENT DOCUMENTS

| CA | 611152 | 12/1960 |
|---|---|---|
| CA | 2173696 | 11/1999 |
| GB | 1007252 | * 10/1965 |

OTHER PUBLICATIONS

Braithwaite, E. R. et al., "Molybdenum: An Outline of its Chemistry and Uses", Elsevier Science B.V. Nov. 1994, pp. 15-20, 146-176, 251-254, 267, 481-539.

(Continued)

*Primary Examiner* — Helene Klemanski
(74) *Attorney, Agent, or Firm* — Pauly, DeVries Smith & Deffner, LLC (57) ABSTRACT

The present invention relates to methods and compositions for coating aluminum substrates. In an embodiment, the invention includes a method of applying a coating on an aluminum substrate including contacting the aluminum substrate with a first solution. The first solution can include a zinc metal salt, a sugar acid or alkali metal salt thereof, and an alkali metal hydroxide. The method can also include contacting the aluminum substrate with a second solution. The second solution can include a molybdate salt, an alkanolamine, and a fluorine acid. Other embodiments are also included herein.

15 Claims, 5 Drawing Sheets

(51) Int. Cl.
*C23C 22/68* (2006.01)
*C23C 22/78* (2006.01)

(56) References Cited

U.S. PATENT DOCUMENTS

| | | | |
|---|---|---|---|
| 2,650,886 | A | 9/1953 | Zelley |
| 2,676,916 | A | 4/1954 | Zelley |
| 2,846,343 | A | 8/1958 | Mason |
| 3,235,404 | A | 2/1966 | Mickelson et al. |
| 3,544,388 | A | 12/1970 | Russell |
| 3,982,055 | A | 9/1976 | Howard |
| 4,018,628 | A | 4/1977 | Paulet |
| 4,082,907 | A | 4/1978 | Schardein et al. |
| 4,192,722 | A | 3/1980 | Schardein et al. |
| 4,346,128 | A | 8/1982 | Loch |
| 4,728,365 | A | 3/1988 | Jarvi |
| 5,182,006 | A * | 1/1993 | Haydu et al. ............... 205/213 |
| 5,534,048 | A | 7/1996 | Dailey et al. |
| 5,601,663 | A | 2/1997 | Rungta et al. |
| 5,667,599 | A | 9/1997 | Rungta et al. |
| 5,795,662 | A | 8/1998 | Maezono et al. |
| 5,931,993 | A | 8/1999 | Bradley |
| 6,080,447 | A | 6/2000 | Ferroni et al. |
| 6,162,343 | A | 12/2000 | Takami et al. |
| 6,500,886 | B1 * | 12/2002 | Yamamuro et al. ........... 524/99 |
| 6,652,728 | B1 * | 11/2003 | Sonntag et al. ............. 205/143 |
| 6,790,265 | B2 | 9/2004 | Joshi et al. |
| 6,811,819 | B2 | 11/2004 | Joshi et al. |
| 7,641,743 | B2 * | 1/2010 | Pearce et al. ............... 106/1.17 |
| 8,691,346 | B2 | 4/2014 | Block et al. |
| 2002/0100694 | A1 * | 8/2002 | Morin et al. ................ 205/170 |
| 2004/0067314 | A1 | 4/2004 | Joshi et al. |
| 2006/0055757 | A1 | 3/2006 | Yamashita et al. |
| 2009/0280258 | A1 | 11/2009 | Block et al. |

OTHER PUBLICATIONS

Durney, Lawrence J., "Electroplating Engineering Handbook", Van Nostrand Reinhold Company Inc. 4th ed. 1984, pp. 185-186.
Final Office Action, for U.S. Appl. No. 12/436,606 mailed Feb. 5, 2013, 11 pages.
Final Office Action, mailed Nov. 15, 2011 in co pending U.S. Appl. No. 12/436,606, "Methods and Compositions for Coating Aluminum Substrates," (11 pages)., 11.
Grubbs, Charles A. et al., "Light Metals Process Manual", American Electroplaters and Surface Finishing Society 1996, pp. 30-41, 63-71.
Jahan, F et al., "Characterization of molybdenum black coatings on zinc substrates", Journal of Materials Science 1997, pp. 3869-3874.
Kushner, Arthur S., "Plating Clinic—In the Black", Products Finishing (www.pfonline.com) http://www.pfonline.com/articles/clinics/0907cl_plate8.html Sep. 2007.
Kushner, Arthur S., "Plating on Aluminum Revisited", Products Finishing (www.pfonline.com) Oct. 2007, pp. 10-11 and 53.
Non Final Office Action, mailed Jun. 23, 2011 in co pending U.S. Appl. No. 12/436,606, "Methods and Compositions for Coating Aluminum Substrates" (16 pages)., 16 pgs.
"Non Final Office Action", mailed Oct. 17, 2012 in U.S. Appl. No. 12/436,606, "Methods and Compositions for Coating Aluminum Substrates," (12 pages).
"Response to Final Office Action", Mailed Feb. 5, 2013, in co-pending U.S. Appl. No. 12/436,606 filed with the USPTO May 6, 2013 (9 pages).
"Response to Final Office Action", Mailed Nov. 15, 2011 in co-pending U.S. Appl. No. 12/436,606, filed with the USPTO Feb. 15, 2012 (7 pages).
"Response to Non Final Office Action", Mailed Jun. 23, 2011 in co-pending U.S. Appl. No. 12/436,606, filed with the USPTO Oct. 14, 2011 (8 pages).
"Response to Non Final Office Action", Mailed Oct. 17, 2012 in co-pending U.S. Appl. No. 12/436,606, filed with the USPTO Jan. 15, 2013 (9 pages).
Sheasby, P. G. et al., "The Surface Treatment and Finishing of Aluminium and its Alloys", Finishing Publications Ltd. (6th Ed). 2001, pp. 1020-1040.
Unknown,, "Metal Finishing Guidebook and Directory", Elsevier Science Inc. 2002, pp. 187-189, 459-460, 463-478.

* cited by examiner

METHODS AND COMPOSITIONS FOR COATING ALUMINUM SUBSTRATES

This application is a divisional of U.S. application Ser. No. 12/436,606 filed May 6, 2009, now U.S. Pat. No. 8,691,346 which claims the benefit of U.S. Provisional Application No. 61/051,922, filed May 9, 2008, the contents of which are herein incorporated by reference.

FIELD OF THE INVENTION

The present invention relates to methods and compositions for coating substrates. More specifically, the present invention relates to methods and compositions for coating aluminum substrates.

BACKGROUND OF THE INVENTION

The term "metal finishing" generally refers to the application of a desired treatment, texture, or coating to the surface of a metal. Metal finishing processes dedicated to the coating of aluminum metal objects are intended to lend aesthetics, utility, and corrosion protection to the coated metal surface. Desired attributes of metal coatings include good adhesion to the metal surface, coating color retention, wear resistance, and corrosion protection.

A variety of non-paint processes are commercially available for blackening aluminum and aluminum alloys. The most prevalent process is anodizing, an electrolytic immersion process that produces aluminum oxide coatings of varying colors, including black. Up to 21 process steps are required to produce anodized coatings. While anodized coatings are extremely durable and corrosion resistant, the application of such coatings is generally restricted to rack work and is not suitable for parts that could otherwise be barrel or basket loaded for greater throughput efficiency. Care must be exercised in racking parts for anodizing to avoid rack marks resulting from poor contact of the aluminum surface with the anodizing solution.

Another process, referred to as "cold blackening," involves the deposition of copper selenide coatings from aqueous media on steel and aluminum substrates. An example of this process is described in U.S. Pat. No. 2,303,350. The aqueous solution contains selenium and copper salts and is applied at room temperature by brush, wipe-on and immersion techniques using 7 to 8 process steps.

The coatings produced by the "cold blackening" process offer good color stability, but are relatively non-adherent and therefore exhibit poor wear resistance. As such, a sealant, wax or other corrosion protective coating must generally be applied immediately following the blackening process to secure the coating and protect the metal surface. In addition, the selenide coating itself affords no corrosion protection to the metal. Finally, this process presents disposal issues as selenium can be highly toxic at even moderate concentrations. The U.S. Environmental Protection Agency has set a maximum contaminant level (MCL) for selenium of only 0.05 parts per million.

Black coatings on aluminum can also be formed by contacting the metal surface at room temperature with a sodium hydroxide solution containing zinc and antimony compounds. However, this process requires tight temperature control as higher temperatures will promote undesirable surface etching. Prolonged immersion times in the blackening treatment also result in rough, non-adherent coatings. Finally, this process presents disposal issues as antimony can be highly toxic. The U.S. Environmental Protection Agency has set a maximum contaminant level (MCL) for antimony of only 6 parts per billion.

As such, a need remains for methods and compositions for coating aluminum substrates.

SUMMARY OF THE INVENTION

The present invention relates to methods and compositions for coating aluminum substrates. In an embodiment, the invention includes a method of applying a coating on an aluminum substrate including contacting the aluminum substrate with a first solution. The first solution can include a zinc metal salt, a sugar acid or alkali metal salt thereof, and an alkali metal hydroxide. The method can also include contacting the aluminum substrate with a second solution. The second solution can include a molybdate salt, an alkanolamine, and a fluorine acid.

In an embodiment, the invention can include an aluminum substrate coated using a method including contacting the aluminum substrate with a first solution and contacting the aluminum substrate with a second solution. The first solution can include a zinc metal salt, a sugar acid or alkali metal salt thereof, and an alkali metal hydroxide. The second solution can include a molybdate salt, an alkanolamine, and a fluorine acid.

In an embodiment, the invention can include a system for applying a coating to an aluminum substrate. The system can include a first tank and a first solution disposed in the first tank. The first solution can include at least about 2 grams per liter of a zinc metal salt, at least about 0.5 grams per liter of a iron metal salt, at least about 2 grams per liter of a carboxylic acid or alkali metal salt thereof, at least about 2 grams per liter of a sugar acid or alkali metal salt thereof, at least about 20 grams per liter of a alkali metal hydroxide, at least about 1 gram per liter of an oxidizing agent. The system can also include a second tank and a second solution disposed in the second tank. The second solution can include at least about 20 grams per liter of a molybdate salt; at least about 10 grams per liter of an alkanolamine; and at least about 2 grams per liter of a fluorine acid.

In an embodiment, the invention can include a kit for applying a coating to an aluminum substrate. The kit can include a first solution comprising at least about 2 grams per liter of a zinc metal salt, at least about 0.5 grams per liter of a iron metal salt, at least about 2 grams per liter of a carboxylic acid or alkali metal salt thereof, at least about 2 grams per liter of a sugar acid or alkali metal salt thereof, at least about 20 grams per liter of a alkali metal hydroxide and at least 1 gram per liter of an oxidizing agent. The kit can also include a second solution comprising at least about 20 grams per liter of a molybdate salt, at least about 10 grams per liter of an alkanolamine, and at least about 2 grams per liter of a fluorine acid.

In an embodiment, the invention can include a composition for applying a coating on an aluminum substrate. The composition can include at least about 2 grams per liter of a zinc metal salt; at least about 0.5 grams per liter of a iron metal salt; at least about 2 grams per liter of a carboxylic acid or alkali metal salt thereof; at least about 2 grams per liter of a sugar acid or alkali metal salt thereof; at least about 20 grams per liter of a alkali metal hydroxide; and at least about 1 gram per liter of an oxidizing agent.

In an embodiment, the invention can include a method of applying a coating on an aluminum substrate. The method can include contacting the aluminum substrate with a first solution. The first solution can include a stannous metal salt, an iron metal salt, a carboxylic acid or alkali metal salt thereof, a sugar acid or alkali metal salt thereof, an alkali metal hydroxide, an oxidizing agent, and a molybdate salt. The method can further include contacting the aluminum substrate with a second solution. The second solution can include a molybdate salt, an alkanolamine, and a fluorine acid.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

As described above, there are various approaches that can be used to apply a coating to an aluminum substrate. However, these approaches have various drawbacks including poor adherence, tight process control requirements, and/or the use of highly toxic compounds.

Yet another approach involves the use alkaline zincate intermediates followed by molybdate treatment. For example, U.S. Pat. No. 4,018,628 (Paulet '628), discloses a method for developing adherent dark gray to black coatings with corrosion resistance on aluminum and aluminum alloys. The method includes acid etching and alkaline zincate intermediates followed by molybdate treatment.

However, testing has revealed that the Paulet '628 process has several weaknesses. For example, the black color achieved with the '628 process rapidly degrades to a brown color (within days), even after being passivated with alkaline amine and silicate solutions and appropriately sealed (see Example 1 below). As the aesthetics of metal coatings are important to the ultimate commercial value of coated metal products, this color instability is commercially unacceptable for many applications. The testing further revealed that the use of a separate alkaline chromate passivation and sealant application did result in color stability. However, there are significant health and environmental hazards associated with exposure to hexavalent chromium-bearing materials. The use of hexavalent chromium-bearing materials has become strictly regulated and, therefore, highly undesirable in industry. Testing of the '628 Paulet process also revealed a tendency for out-gassing on the aluminum surface resulting in rougher, less smooth finishes. Finally, the '628 process requires relatively elevated molybdate bath temperatures to achieve black coatings.

Applicants have discovered methods and compositions that can provide coatings on aluminum substrates while offering various benefits. By way of example, embodiments of the process can result in coatings that are strongly adherent and have good color stability while avoiding the use of highly toxic compounds. In addition, embodiments herein can avoid the use of a separate passivation step to achieve color stability. In an embodiment, the invention includes a method of applying a coating on an aluminum substrate including contacting the aluminum substrate with a first solution, the first solution including a zinc metal salt, an iron metal salt, a carboxylic acid or alkali metal salt thereof, a sugar acid or alkali metal salt thereof, an alkali metal hydroxide, and an oxidizing agent. The method can also include contacting the aluminum substrate with a second solution, the second solution including a molybdate salt, an alkanolamine, and a fluorine acid.

Figure 1:
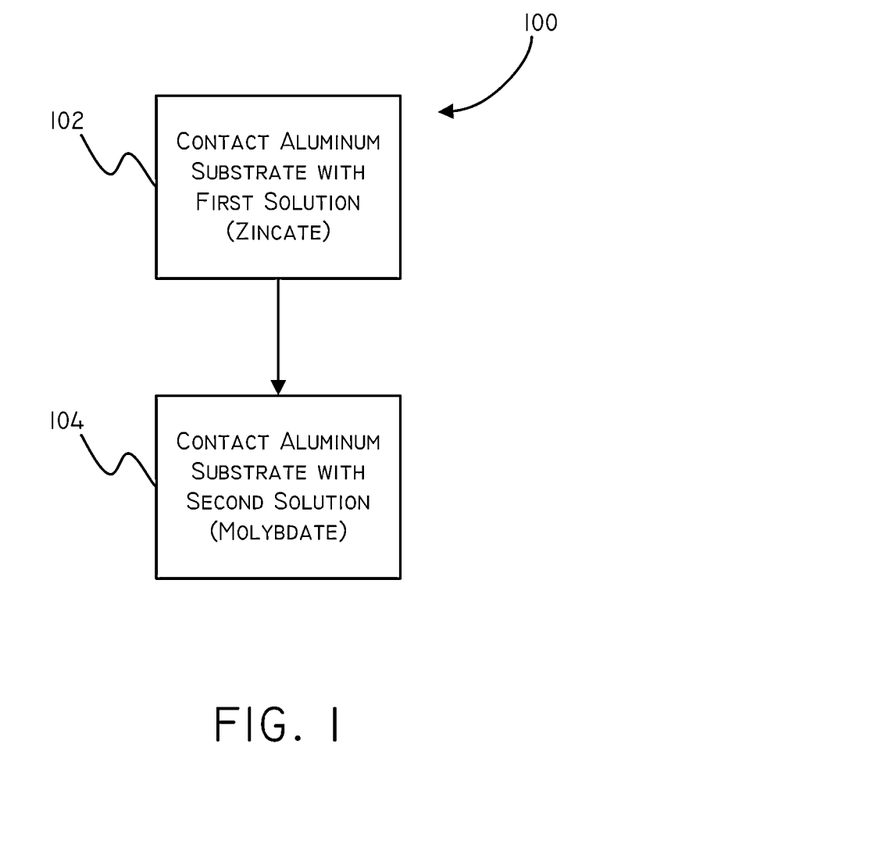
FIG. 1 is a flow chart illustrating a method in accordance with an embodiment of the invention.

Referring now to FIG. 1, a flow chart is shown of a method 100 in accordance with an embodiment herein. The method 100 can include contacting an aluminum substrate with a first solution 102. In this embodiment, the first solution can be referred to as a zincate solution. The first solution can function to deposit a layer of zinc on the aluminum substrate. The first solution can include components such as a zinc metal salt, an iron metal salt, a carboxylic acid or alkali metal salt thereof, a sugar acid, derivative, or alkali metal salt thereof, an alkali metal hydroxide, and an oxidizing agent. Further details of exemplary first zincate solutions are described in greater detail below.

The temperatures of the first solution can be greater than 35 degrees Fahrenheit. In some embodiments, the temperature of the first solution is maintained at or above 50 degrees Fahrenheit. In some embodiments, the temperature of the first solution in this embodiment can be about normal room temperature. For example, the temperature of the first solution can be from about 64 to about 75 degrees Fahrenheit. However, in some embodiments, the first solution may be kept at a temperature that is lower or higher than that range. The contact time with the first solution can be an amount of time sufficient for a layer of zinc having a desirable thickness to be deposited onto the aluminum substrate. In some embodiments, the contact time can be greater than about 10 seconds. In some embodiments, the contact time can be from about 30 seconds to about 15 minutes. In some embodiments, the contact time can be from about 30 seconds to about 3 minutes. The pH of the first solution can be greater than about 12.

Next, the method 100 can include contacting the aluminum substrate with a second solution 104. The second solution in this embodiment can be referred to as a molybdate solution. The second solution can function to color the work piece. Prior to application of the second solution, the aluminum substrate may take on a dull gray color that is a result of zinc deposition. Application of the second solution can cause the aluminum substrate to rapidly take on a uniform black appearance. The second solution can include components such as a molybdate salt, an alkanolamine, and a fluorine acid. Further details of exemplary second solutions are described in greater detail below.

The temperature of the second solution can be greater than about 50 degrees Fahrenheit. In some embodiments, the temperature of the second solution can be greater than about 130 degrees Fahrenheit. In some embodiments, the temperature of the second solution can be from about 180 degrees Fahrenheit to about 200 degrees Fahrenheit. The pH of the second solution can be from about 5.5 to about 9.0. In some embodiments, the pH of the second solution can be about 7. The contact time can be greater than about 30 seconds. In some embodiments, the contact time can be from about 30 seconds to about 15 minutes. In some embodiments, the contact time can be from about 2 minutes to about 10 minutes.

Figure 2:
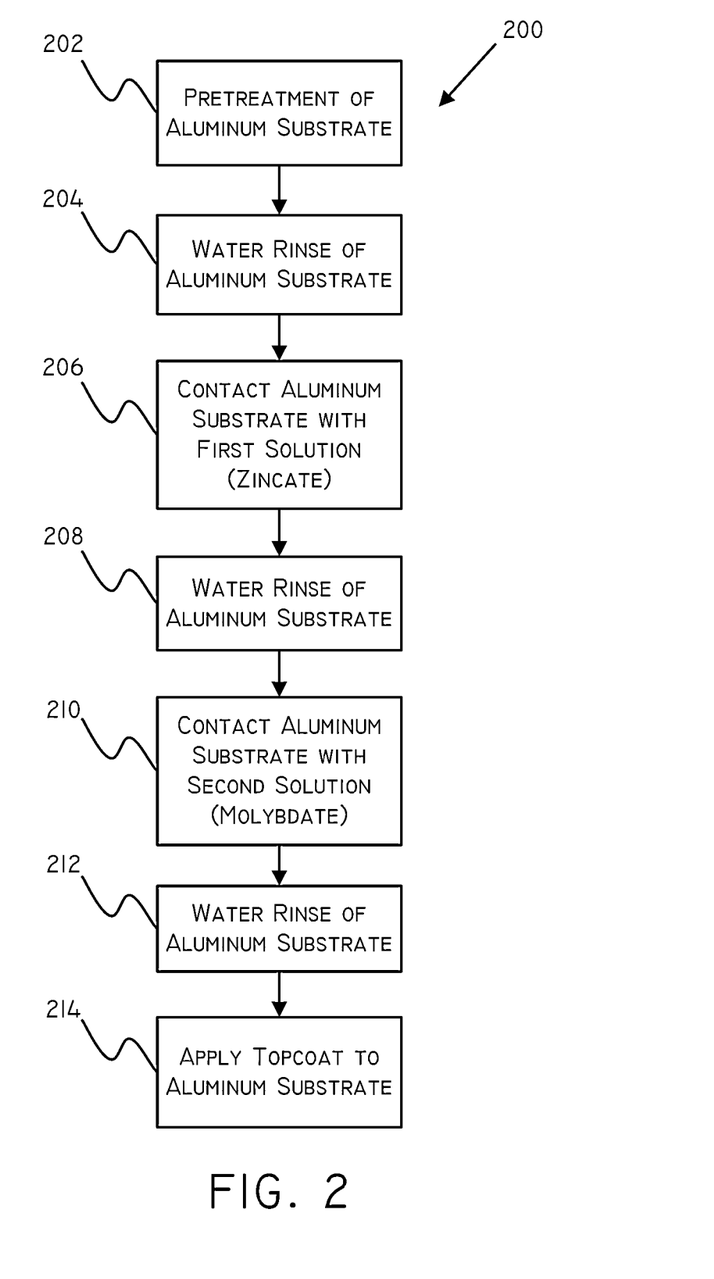
FIG. 2 is a flow chart illustrating a method in accordance with another embodiment of the invention.

It will be appreciated that exemplary methods can also include other operations. By way of example, in some embodiments, methods can also include pretreatment operations, rinsing operations, top coating and/or sealing operations, and the like. Referring now to FIG. 2, a flow chart of a method 200 is shown in accordance with another embodiment of the invention. The method can include pre-treating 202 the aluminum substrate. Details of exemplary pretreatment operations are described in greater detail below. After pretreatment, the method can include a first rinsing 204 of the aluminum substrate. In some embodiments, the rinse solution can be water. In other embodiments, the rinse solution can include other components. The method 200 can then include contacting the aluminum substrate with a first solution 206. After contacting with the first solution, the method 200 can include a second rinsing 208. The method 200 can then include contacting the aluminum substrate with a second solution 210. The method 200 can then include a third rinsing 212. In some embodiments, the method 200 can also include applying a topcoat and/or sealant 214 to the now-coated aluminum substrate. Details of exemplary top coating and/or sealing operations are described in greater detail below.

Figure 3:
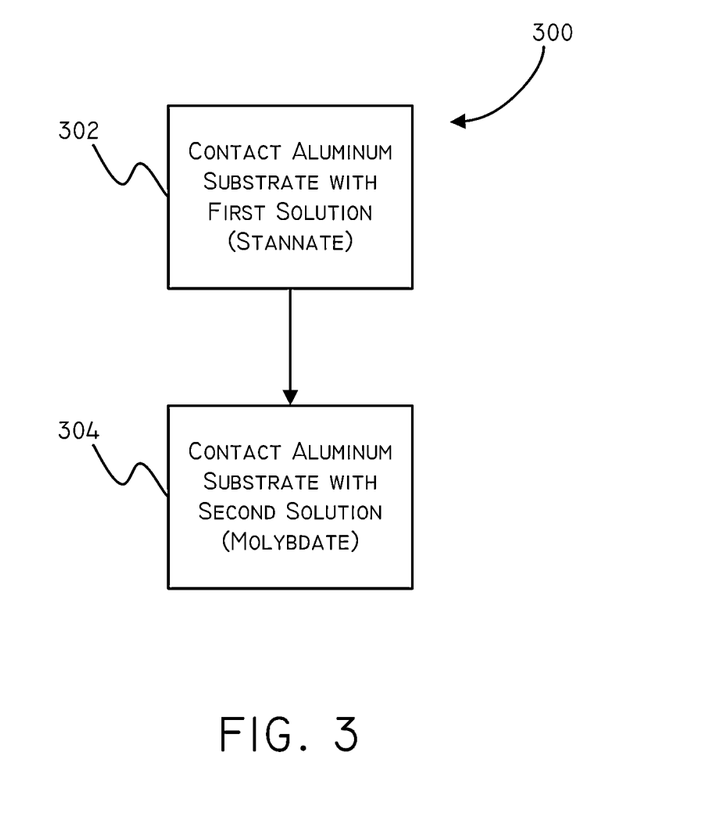
FIG. 3 is a flow chart illustrating a method in accordance with another embodiment of the invention.

In some embodiments, methods included herein can include the deposition of a tin layer instead of a zinc layer as an intermediate step in the overall process of applying a coating to an aluminum substrate. Referring now to FIG. 3, a flow chart is shown illustrating an embodiment of a method 300 that results in the deposition of a tin layer. The method 300 can include contacting an aluminum substrate with a first solution 302 that in this embodiment can be referred to as a stannate solution. The first solution in this embodiment can function to deposit a layer of tin on the aluminum substrate. The first solution can include components such as a stannous metal salt, an iron metal salt, a carboxylic acid or alkali metal salt thereof, a sugar acid, derivative or alkali metal salt thereof, an alkali metal hydroxide, an oxidizing agent, and a molybdate salt. Further details of exemplary stannate first solutions are described in greater detail below.

The temperatures of the first solution can be greater than 35 degrees Fahrenheit. In some embodiments, the temperature of the first solution is maintained at or above 50 degrees Fahrenheit. In some embodiments, the temperature of the first solution in this embodiment can be about normal room temperature. For example, the temperature of the first solution can be from about 64 to about 75 degrees Fahrenheit. However, in some embodiments, the first solution may be kept at a temperature that is lower or higher than that range. The contact time with the first solution can be an amount of time sufficient for a layer of tin having a desirable thickness to be deposited onto the aluminum substrate. In some embodiments, the contact time can be greater than about 10 seconds. In some embodiments, the contact time can be from about 30 seconds to about 15 minutes. In some embodiments, the contact time can be from about 30 seconds to about 3 minutes.

Next, the method 300 can include contacting the aluminum substrate with a second solution 304. The second solution in this embodiment can be referred to as a molybdate solution. The second solution can function to color the work piece. The second solution can include components such as a molybdate salt, an alkanolamine, and a fluorine acid. Further details of exemplary second solutions are described in greater detail below.

The temperature of the second solution can be greater than about 50 degrees Fahrenheit. In some embodiments, the temperature of the second solution can be greater than about 130 degrees Fahrenheit. In some embodiments, the temperature of the second solution can be from about 180 degrees Fahrenheit to about 200 degrees Fahrenheit. The pH of the second solution can be from about 5.5 to about 9.0. In some embodiments, the pH of the second solution can be about 7. The contact time can be greater than about 30 seconds. In some embodiments, the contact time can be from about 30 seconds to about 15 minutes. In some embodiments, the contact time can be from about 2 minutes to about 10 minutes.

In various embodiments herein, an aluminum substrate can be contacted with a first solution and then contacted with a second solution. It will be appreciated that contacting an aluminum substrate with these solutions can be performed in various ways. By way of example, in some embodiments, solutions can be applied to a substrate using techniques including spraying, rolling, brushing, dip coating, and the like.

Figure 4:
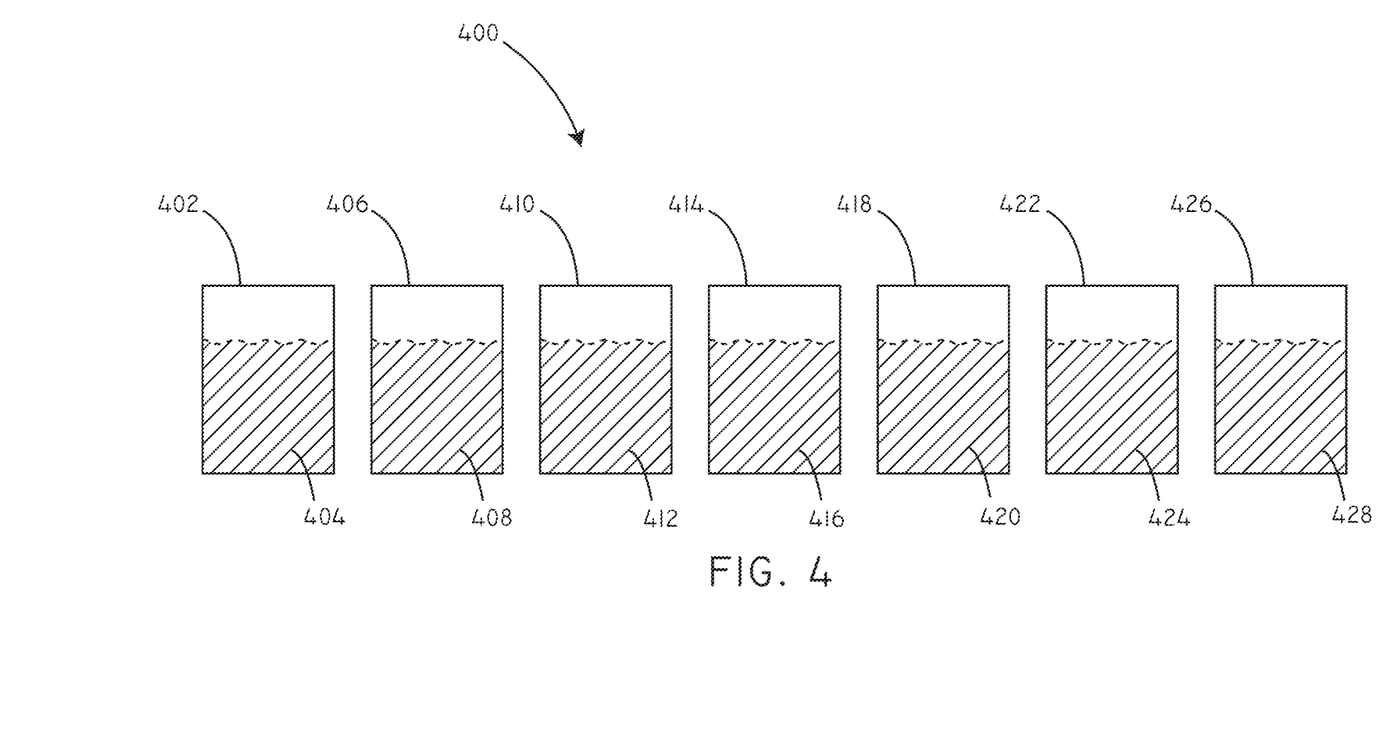
FIG. 4 is a schematic diagram illustrating a system for applying a coating to a substrate in accordance with an embodiment of the invention.

In some embodiments, a series of tanks can be arranged forming a production line and each tank filled with a solution to facilitate a particular part of the overall coating process. Then a substrate can be successively dipped into each of the tanks on the production line in order to provide the substrate with the desired coating. Referring now to FIG. 4, is a schematic diagram illustrating a system 400 for applying a coating to a substrate in accordance with an embodiment of the invention. The system can include a first tank 402 holding a first liquid 404, a second tank 406 holding a second liquid 408, a third tank 410 holding a third liquid 412, a fourth tank 414 holding a fourth liquid 416, a fifth tank 418 holding a fifth liquid 420, a sixth tank 422 holding a sixth liquid 424, and a seventh tank 426 holding a seventh liquid 428. The first liquid 404 can be, for example, a solution for pretreatment such as an alkaline cleaning solution or an acidic etching solution. The second liquid 408 can be, for example, water to facilitate rinsing the substrate. The third liquid 412 can be, for example, a first solution as described herein, such as a zincate or stannate solution. The fourth liquid 416 can be, for example, water to facilitate rinsing the substrate. The fifth liquid 420 can be, for example, a second solution such as a molybdate solution. The sixth liquid 424 can be, for example, water to facilitate rinsing of the substrate. The seventh liquid 428 can be, for example, a sealing or top coating solution.

In some embodiments, system can include fewer than the seven tanks shown in FIG. 4. For example, in some systems, only two tanks may be used. Individual tanks can include other features, not shown, in order to facilitate their role in a specific part of the coating process. By way of example, some of the tanks may be provided with heating elements and a temperature controller in order to maintain the temperature of the solution in side of the tank at a desirable level. In some embodiments, the system can also include features in order to automate the coating process. By way of example, the system can include a conveying mechanism (not shown) to automatically move work pieces from one tank to another as used in the coating process.

First Solution (Zincate)

In some embodiments herein, the first solution can be a zincate solution. Zincate solutions can function to deposit a layer of zinc onto aluminum substrates. Zincate solutions in accordance with embodiments herein can include a zinc metal salt. Exemplary zinc metal salts can include zinc oxide, zinc chloride, zinc sulfate, zinc nitrate, and zinc acetate. In a particular embodiment, the zinc metal salt can include zinc (II) oxide. The concentration of the zinc metal salt in the zincate solution can be greater than about 2 grams per liter. The concentration of the zinc metal salt in the zincate solution can be less than about 20 grams per liter. In some embodiments the concentration of the zinc metal salt can be between 2 and 20 grams per liter. In some embodiments the concentration of the zinc metal salt can be about 10 grams per liter.

Zincate solutions in accordance with embodiments herein can also include an iron metal salt. Exemplary iron metal salts can include iron (III) salts. In a particular embodiment, the iron metal salt includes iron (III) chloride. The concentration of the iron metal salt in the zincate solution can be greater than 0.5 grams per liter. The concentration of the iron metal salt in the zincate solution can be less than 10 grams per liter. In some embodiments the concentration of the iron metal salt can be between 0.5 and 10 grams per liter. In some embodiments, the concentration of the iron metal salt can be about 2 grams per liter.

Zincate solutions in accordance with embodiments herein can include a carboxylic acid or alkali metal salt thereof. Exemplary carboxylic acids can include mono-, di-, and tri-carboxylic acids. Exemplary carboxylic acids can specifically include glycolic, malic, tartaric, and citric acids, and alkali metal salts thereof. Exemplary alkali metal salts of carboxylic acids can specifically include sodium tartrate, potassium tartrate, and/or sodium-potassium tartrate. The concentration of the carboxylic acid in the zincate solution can be greater than 2 grams per liter. The concentration of the carboxylic acid in the zincate solution can be less than 25 grams per liter. In some embodiments the concentration of the carboxylic acid can be between 2 and 25 grams per liter. In some embodiments, the concentration of the carboxylic acid can be about 10 grams per liter.

Zincate solutions in accordance with embodiments herein can include a sugar acid. Sugar acids are oxidized derivatives of sugars, including monosaccharides, disaccharides, and polysaccharides, that have one or more carboxylic acid groups. Exemplary sugar acids as used in embodiments herein can also include derivatives and alkali metal salts thereof. Exemplary sugar acids can specifically include gluconic acid, glucoheptonic acid. Exemplary sugar acids salts can specifically include sodium gluconate and/or sodium glucoheptonate. The concentration of the sugar acid in the zincate solution can be greater than or equal to 2 grams per liter. The concentration of the sugar acid in the zincate solution can be less than or equal to 20 grams per liter. In some embodiments the concentration of the sugar acid can be between 2 and 20 grams per liter. In some embodiments, the concentration of the sugar acid can be about 6 grams per liter.

Zincate solutions in accordance with embodiments herein can include an alkali metal hydroxide. Exemplary alkali metal hydroxides can include sodium hydroxide, potassium hydroxide, and/or lithium hydroxide. The concentration of the alkali metal hydroxide in the zincate solution can be an amount sufficient to make the pH of the zincate solution greater than about 12. The concentration of the alkali metal hydroxide in the zincate solution can be greater than or equal to 20 grams per liter. The concentration of the alkali metal hydroxide in the zincate solution can be less than or equal to 300 grams per liter. In some embodiments the concentration of the alkali metal hydroxide can be between 20 and 300 grams per liter. In some embodiments, the concentration of the alkali metal hydroxide can be about 50 grams per liter.

Zincate solutions in accordance with embodiments herein can include an oxidizing agent. Exemplary oxidizing agents can include alkali metal nitrates. Exemplary alkali metal nitrates can include sodium nitrate and/or potassium nitrate. The concentration of the oxidizing agent in the zincate solution can be greater than or equal to about 1 gram per liter. The concentration of the oxidizing agent in the zincate solution can be less than or equal to about 10 gram per liter. In some embodiments the concentration of the oxidizing agent can be between 1 and 10 grams per liter. In some embodiments, the concentration of the oxidizing agent can be about 5 grams per liter.

In some embodiments, the zincate solution can also include other components.

In some embodiments the zincate solution can be formed by adding water to a vessel, then adding the iron metal salt, then the carboxylic acid, sugar acid, and oxidizing agent, then the alkali metal hydroxide, and then the zinc metal salt. It will be appreciated though that other procedures are contemplated herein.

First Solution (Stannate)

In some embodiments here, the first solution can be a stannate solution. Stannate solutions can function to deposit a layer of tin onto aluminum substrates. Stannate solutions in accordance with embodiments herein can include a stannous metal salt. Exemplary stannous metal salts can include tin oxide. The concentration of the stannous metal salt in the stannate solution can be greater than 2.0 grams per liter. In some embodiments the concentration of the stannous metal salt can be between 4 and 10 grams per liter.

Stannate solutions in accordance with embodiments herein can also include an iron metal salt. In a particular embodiment, the iron metal salt includes iron (III) chloride. The concentration of the iron metal salt in the stannate solution can be greater than 0.5 grams per liter. The concentration of the iron metal salt in the stannate solution can be less than 10 grams per liter. In some embodiments the concentration of the iron metal salt can be between 0.5 and 10 grams per liter. In some embodiments, the concentration of the iron metal salt can be about 2 grams per liter.

Stannate solutions in accordance with embodiments herein can also include a carboxylic acid or alkali metal salt thereof. Exemplary carboxylic acids can include mono-, di-, and tri-carboxylic acids. Exemplary carboxylic acids can specifically include glycolic, malic, tartaric, and citric acids, and alkali metal salts thereof. Exemplary alkali metal salts of carboxylic acids can specifically include sodium tartrate, potassium tartrate, and/or sodium-potassium tartrate. The concentration of the carboxylic acid in the stannate solution can be greater than 2 grams per liter. The concentration of the carboxylic acid in the stannate solution can be less than 25 grams per liter. In some embodiments the concentration of the carboxylic acid can be between 2 and 25 grams per liter. In some embodiments, the concentration of the carboxylic acid can be about 10 grams per liter.

Stannate solutions in accordance with embodiments herein can also include a sugar acid. Exemplary sugar acids can include mono- and polysaccharide acids, derivatives thereof, and alkali metal salts thereof. Exemplary sugar acids can specifically include gluconic acid, glucoheptonic acid. Exemplary sugar acids salts can specifically include sodium gluconate and/or sodium glucoheptonate. The concentration of the sugar acid in the stannate solution can be greater than or equal to 2grams per liter. The concentration of the sugar acid in the stannate solution can be less than or equal to 20 grams per liter. In some embodiments the concentration of the sugar acid can be between 2 and 20 grams per liter. In some embodiments, the concentration of the sugar acid can be about 6 grams per liter.

Stannate solutions in accordance with embodiments herein can also include an alkali metal hydroxide. Exemplary alkali metal hydroxides can include sodium hydroxide, potassium hydroxide, and/or lithium hydroxide. The concentration of the alkali metal hydroxide in the stannate solution can be an amount sufficient to make the pH of the stannate solution greater that about 12. The concentration of the alkali metal hydroxide in the stannate solution can be greater than or equal to 20 grams per liter. The concentration of the alkali metal hydroxide in the stannate solution can be less than or equal to 300 grams per liter. In some embodiments the concentration of the alkali metal hydroxide can be between 20 and 300 grams per liter. In some embodiments, the concentration of the alkali metal hydroxide can be about 50 grams per liter.

Stannate solutions in accordance with embodiments herein can also include an oxidizing agent. Exemplary oxidizing agents can include alkali metal nitrates. Exemplary alkali metal nitrates can include sodium nitrate and/or potassium nitrate. The concentration of the oxidizing agent in the stannate solution can be greater than or equal to about 1 gram per liter. The concentration of the oxidizing agent in the stannate solution can be less than or equal to about 10 gram per liter. In some embodiments the concentration of the oxidizing agent can be between 1 and 10 grams per liter. In some embodiments, the concentration of the oxidizing agent can be about 5 grams per liter.

Stannate solutions in accordance with embodiments herein can also include a molybdate salt. Exemplary molybdate salts can include sodium molybdate. The concentration of the molybdate salt in the stannate solution can be greater than or equal to 2 grams per liter. In some embodiments, the concentration of the molybdate salt in the stannate solution can be less than or equal to 10 grams per liter. In some embodiments the concentration of the molybdate salt in the stannate solution can be between 4 and 12 grams per liter.

In some embodiments, the stannate solution can also include other components.

In some embodiments the stannate solution can be formed by adding water to a vessel, then adding the iron metal salt, then the carboxylic acid, sugar acid, molybdate salt and oxidizing agent, then the alkali metal hydroxide, and then the stannous metal salt. It will be appreciated though that other procedures are contemplated herein.

Second Solution (Molybdate)

Molybdate solutions can be used in accordance with embodiments herein to turn a coating on an aluminum substrate into a desirable color. For example, a molybdate solution can be applied to an aluminum substrate that already has a coating of zinc or tin and cause the coating to turn to a uniform black color. Molybdate solutions in accordance with embodiments herein can include various components including a molybdate salt, an alkanolamine, and a fluorine acid, amongst other things.

Molybdate solutions in accordance with embodiments herein can specifically include a molybdate salt. Exemplary molybdate salts can include ammonium heptamolybdate and ammonium dimolybdate. In a particular embodiment, the molybdate salt is ammonium heptamolybdate. The concentration of the molybdate salt in the molybdate solution can be greater than or equal to 20 grams per liter. The concentration of the molybdate salt in the molybdate solution can be less than or equal to 70 grams per liter. In some embodiments the concentration of the molybdate salt can be between 20 and 70 grams per liter. In some embodiments, the concentration of the molybdate salt can be about 40 grams per liter.

Molybdate solutions in accordance with embodiments herein can include an alkanolamine. Exemplary alkanolamines can include ethanolamine (freezing point=50° F.), triethanolamine (freezing point=71° F.), and 2-amino-2-methyl-1-propanol (freezing point=28° F.) (available commercially as AMP-95™ from Dow Chemical Company, Midland, Mich.). It has been found that the use of 2-amino-2-methyl-1-propanol can be advantageous because of its relatively low freezing point aiding solution stability. In addition, unlike ethanolamine and triethanolamine, 2-amino-2-methyl-1-propanol does not generate ammonia gas upon addition to, and subsequent use in, the molybdate solution bath providing another advantage. The concentration of the alkanolamine in the molybdate solution can be an amount sufficient to adjust the pH of the molybdate solution to about 7.0. The concentration of the alkanolamine in the molybdate solution can be greater than or equal to about 10 grams per liter. The concentration of the alkanolamine in the molybdate solution can be less than or equal to about 50 grams per liter. In some embodiments the concentration of the alkanolamine can be between 10 and 50 grams per liter. In some embodiments, the concentration of the alkanolamine in the molybdate solution can be about 30 grams per liter.

Molybdate solutions in accordance with embodiments herein can include a fluorine acid. Fluorine acids are acids that include one or more fluorine atoms. Exemplary fluorine acids can include fluoroboric acid and fluorosilicic acid. In an embodiment, the fluorine acid is fluoroboric acid. The concentration of the fluorine acid in the molybdate solution can be greater than or equal to 2 grams per liter. The concentration of the fluorine acid in the molybdate solution can be less than or equal to 15 grams per liter. In some embodiments the concentration of the fluorine acid can be between 2 and 15 grams per liter. In some embodiments, the concentration of the fluorine acid can be about 7 grams per liter.

In some embodiments, the molybdate solution can also include other components.

Aluminum Substrates

Aluminum substrates as used with embodiments herein can include substrates made of pure aluminum as well as aluminum alloys. Exemplary alloys can include both wrought alloys and cast alloys. Exemplary wrought alloys can include aluminum alloys of the 1000 series, 2000 series, 3000 series, 4000 series, 5000 series, 6000 series, 7000 series, and 8000 series. Exemplary alloys can include those with aluminum content of greater than about 70 percent aluminum. In some embodiments, alloys used can include those with aluminum content of greater than about 80 percent aluminum. In some embodiments, alloys used can include those with aluminum content of greater than about 90 percent aluminum. The aluminum substrates can take on any shape desired for end use include bars, castings, extrusions, sheets, screens, blocks, and the like.

Substrate Pretreatment

In some embodiments the aluminum substrate may be subjected to a pretreating operation before other processing steps such as treatment with the first solution. Pretreatment can function to remove contaminants from the aluminum substrate surface such as residual oils and other compounds left over from metal processing steps. In some embodiments, pretreatment can also be used to remove aluminum oxide from the surface of the aluminum substrate.

Exemplary pretreating operations can specifically include abrasive cleaning, alkaline cleaning, and/or acid etching. By way of example, in some embodiments the aluminum substrate can be pretreated by sanding with an abrasive such as sand paper. In some embodiments, the aluminum substrate can be pretreated by sand blasting. In some embodiments, the aluminum substrate can be washed with an alkaline cleaning solution. For example, the aluminum substrate can be washed with a solution having a pH of greater than 7. such as an aqueous solution including alkaline detergent builders and surface tension reducers.

In some embodiments, the aluminum substrate can be etched with an acidic solution. By way of example, the aluminum substrate can be etched with an aqueous solution having a pH of less than 4. In some embodiments, the aluminum substrate can be etched with a solution including nitric acid, sulfuric acid, hydrochloric acid or mixtures thereof. In some embodiments, the aluminum substrate can be etched with a solution including nitric acid and a fluoride salt. In some embodiments, a dry acid salt blend can be used to prepare a solution in order to etch the aluminum substrate. For example, a blend of sodium acid bisulfate, sulfamic acid, a fluoride salt, and a naphthalene sulfonate wetting agent can be added to water in order to form a solution to etch the aluminum substrate. An exemplary dry acid salt blend is available as OXYPRIME® XP, available from Birchwood Laboratories, Inc. (Eden Prairie, Minn.).

Topcoating and/or Sealing

In some embodiments the aluminum substrate may be subjected to a top coating and/or sealing operation after other steps of the process have been performed. Top coating of the aluminum substrate can function to improve the aesthetic properties of the finish as well as increase corrosion resistance, improve color stability, and improve the adherence of the newly applied black coating. Top coating and/or sealing can be formed by applying a top coating solution to the aluminum substrate. Exemplary top coating solutions can include an oil, polymer, and/or other film former appropriate to the end use of the article. In some embodiments, the substrate can be further processed with an oil emulsion in order to provide enhanced corrosion resistance.

The present invention may be better understood with reference to the following examples. These examples are intended to be representative of specific embodiments of the invention, and are not intended as limiting the scope of the invention.

EXAMPLES

Example 1

Coating of Aluminum (3003 Alloy) Panels

A first zincate solution was prepared having the composition shown below in Table 1. The zincate solution was maintained at room temperature.

TABLE 1

| Sodium hydroxide | 50 grams per liter |
| Zinc oxide | 10 grams per liter |
| Iron (III) chloride | 2 grams per liter |
| Sodium nitrate | 5 grams per liter |
| Potassium sodium tartrate | 10 grams per liter |
| Sodium gluconate | 6 grams per liter |

A second zincate solution was prepared identical to the first zincate solution with the exception that sodium glucoheptonate was used instead of sodium gluconate.

A first molybdate solution was prepared having the composition shown below in Table 2. The first molybdate solution was maintained at 190 degrees Fahrenheit. The first molybdate solution had a pH of 6.5.

TABLE 2

| Ammonium heptamolybdate | 50 grams per liter |
| Fluoroboric acid | 10 grams per liter |
| 2-amino-2-methyl-1-propanol | 30 grams per liter |

Test Panels

Standard 4"×6" aluminum panels of 3003 alloy were then processed using the zincate and molybdate solutions described above. Specifically, the aluminum panels were first alkaline cleaned and then rinsed in a water bath. Next, a first set of the aluminum panels (Test Set A) were dipped into the first zincate solution for 30 seconds. Then, a second set of the aluminum panels (Test Set B) were dipped into the second zincate solution for 30 seconds. In both cases, the aluminum panels were then removed from the zincate solution and rinsed in a second water bath. In both cases, the aluminum panels were then dipped into the molybdate solution for approximately 4 minutes. In both cases the aluminum panels were observed to take on a deep, uniform black color. The aluminum panels were then rinsed in a third water bath and then removed and dried.

Comparison Panels

Additional 4"×6" aluminum panels of 3003 alloy were then coated in a manner representative of the process of Paulet '628. Specifically, a third zincate solution was prepared as shown in Table 3 below (see example 4 of Paulet '628).

TABLE 3

| Sodium hydroxide | 100 grams per liter |
| Zinc oxide | 20 grams per liter |
| Iron (III) chloride | 2 grams per liter |
| Sodium nitrate | 1 gram per liter |
| Potassium sodium tartrate | 50 grams per liter |

A second molybdate solution was prepared as shown in Table 4 below (see example 6 of Paulet '628).

TABLE 4

| Ammonium heptamolybdate | 50 grams per liter |
| Ammonium fluoroborate | 15 grams per liter |
| Triethanolamine | 80 grams per liter |

Three different passivating solutions were then prepared for use with the comparison panels. Passivating solution #1 included 10 grams per liter of sodium dichromate in water. Passivating solution #2 included 10 grams per liter of sodium metasilicate in water. Passivating solution #3 included 10 grams per liter of monoethanolamine in water.

The comparison panels were then divided into four sets (Comparison Set C, Comparison Set D, Comparison Set E, and Comparison Set F). All four groups were treated identically with respect to the third zincate solution and the second molybdate solution. Specifically, all four groups rinsed in a water bath and then dipped into the third zincate solution (held at room temperature) for 30 seconds. The panels were then rinsed again and dipped into the second molybdate solution (held at 180 degrees Fahrenheit) for 4 minutes.

The panels of Comparison Set C were then simply rinsed and put aside. However, the panels of Comparison Set D were then rinsed and dipped into passivating solution #1 for 1 minute. The panels of Comparison Set E were rinsed and dipped into passivating solution #2 for 1 minute. The panels of Comparison Set F were rinsed and dipped into passivating solution #3 for 1 minute. All panels were then rinsed and dried.

Color Stability Testing

All of the panels (Test Sets A-B and Comparison Sets C-F) were then tested for color stability. Specifically, the panels were stored under ambient conditions and the color was assessed after various periods of time. The results of this assessment are shown below in Table 5.

TABLE 5

| Panel Group | Day 0 | Day 14 | Day 60 |
|---|---|---|---|
| Test Set A | Uniformly Black | Uniformly Black | Uniformly Black |
| Test Set B | Uniformly Black | Uniformly Black | Uniformly Black |
| Comparison Set C | Uniformly Black | Brown | Brown |
| Comparison Set D | Uniformly Black | Uniformly Black | Uniformly Black |
| Comparison Set E | Uniformly Black | Light Black | Brown |
| Comparison Set F | Uniformly Black | Light Black | Brown |

As shown in Table 5. the comparison sets all failed to exhibit color stability over an extended period time with the only exception being Comparison Set D which included the use of the sodium dichromate passivating solution. As such, this example shows that compositions and methods of the invention can be used to create uniform black coatings on aluminum substrates that exhibit a high degree of color stability without the need for a separate passivating treatment using a toxic substance such as sodium dichromate.

Example 2

Aluminum (1100 Alloy) Mesh Screen

A 6"×6" section of aluminum mesh screen was obtained and alkaline cleaned in an alkaline detergent bath to remove light soil and rinsed with clean water.

The mesh screen was then immersed for 30 seconds at room temperature in a zincate bath having the composition of Table 6 below. While immersed in the zincate bath, the mesh sample acquired a uniform gray appearance.

TABLE 6

| Sodium hydroxide | 50 grams per liter |
|---|---|
| Zinc oxide | 10 grams per liter |
| Iron (III) chloride | 1.5 grams per liter |
| Sodium nitrate | 5 grams per liter |
| Potassium sodium tartrate | 8 grams per liter |
| Sodium gluconate | 5 grams per liter |

The mesh sample was then rinsed in clean water and immersed for about 4 minutes at 170° F. in a molybdate bath having the composition shown in Table 7 below at a pH of 6.5.

TABLE 7

| Ammonium heptamolybdate | 50 grams per liter |
|---|---|
| Fluoroboric acid | 10 grams per liter |
| 2-amino-2-methyl-1-propanol | 30 grams per liter |

The mesh acquired a uniform black color while immersed in the molybdate bath. The mesh part was then rinsed with clean water. When wiped with a white paper towel, the coating exhibited no rub-off indicating a strongly adherent coating.

Example 3

Aluminum (3003 Alloy) Panel

An aluminum panel (3003 Alloy) was obtained and alkaline cleaned in an alkaline detergent bath to remove light soil and rinsed with clean water.

The panel was then immersed for 30 seconds at room temperature in a zincate bath having the composition of Table 6 above. While immersed in the zincate bath, the panel acquired a uniform gray appearance.

The panel was then rinsed in clean water and immersed for about 5 minutes at 195° F. in a molybdate bath having the composition shown in Table 8 below at a pH of 7.0.

TABLE 8

| Ammonium heptamolybdate | 50 grams per liter |
|---|---|
| Fluoroboric acid | 10 grams per liter |
| 2-amino-2-methyl-1-propanol | 30 grams per liter |

The mesh acquired a uniform black color while immersed in the molybdate bath. The mesh part was then rinsed with clean water. When wiped with a white paper towel, the coating exhibited no rub-off indicating a strongly adherent coating. The panel was then coated with a water-base urethane clear coat and allowed to dry.

Example 4

Aluminum (3003 Alloy) Panel

An aluminum panel (3003 Alloy) was obtained and alkaline cleaned in an alkaline detergent bath to remove light soil and rinsed with clean water.

The panel was then immersed for 5 minutes at 90 degrees Fahrenheit in a zincate bath having the composition of Table 9 below. While immersed in the zincate bath, the panel acquired a uniform gray appearance.

TABLE 9

| Sodium hydroxide | 30 grams per liter |
|---|---|
| Zinc oxide | 5 grams per liter |
| Iron (III) chloride | 1 gram per liter |
| Sodium nitrate | 3 grams per liter |
| Potassium sodium tartrate | 6 grams per liter |
| Sodium gluconate | 3 grams per liter |

The panel was then rinsed in clean water and immersed for about 4 minutes at 190° F. in a molybdate bath having the composition shown in Table 8 above at a pH of 7.0. While immersed in the bath the panel acquires a uniform black appearance.

The panel was then rinsed with water and coated with a light oil. When wiped with a white paper towel, the coating exhibited no rub-off indicating a strongly adherent coating.

Example 5

Aluminum (6061 Alloy) Bar Stock

A piece of aluminum bar stock (6061 Alloy) was obtained and alkaline cleaned in an alkaline detergent bath to remove light soil and rinsed with clean water.

The bar stock was then immersed for about 2 minutes at room temperature in a etch-deoxidizer bath containing about 50% by volume nitric acid and about 2 grams per liter of $NH_4F$, then rinsed with water.

The bar stock was then immersed for about 2 minutes at room temperature in a zincate bath containing the composition shown in Table 10 below. While immersed in the zincate bath, the bar stock acquired a light gray coating.

TABLE 10

| | |
|---|---|
| Sodium hydroxide | 50 grams per liter |
| Zinc oxide | 10 grams per liter |
| Iron (III) chloride | 2 grams per liter |
| Sodium nitrate | 5 grams per liter |
| Potassium sodium tartrate | 8 grams per liter |
| Sodium gluconate | 5 grams per liter |

The bar stock was rinsed and immersed for about 4 minutes at about 200° F. in a bath containing the composition shown in Table 11 below at a pH of about 7.0. While immersed in the bath, the bar stock acquired a uniform black appearance.

TABLE 11

| | |
|---|---|
| Ammonium heptamolybdate | 50 grams per liter |
| Fluoroboric acid | 10 grams per liter |
| 2-amino-2-methyl-1-propanol | 30 grams per liter |

The bar stock was then rinsed and a water-based urethane clear coat was then applied and allowed to air dry.

Figure 5:
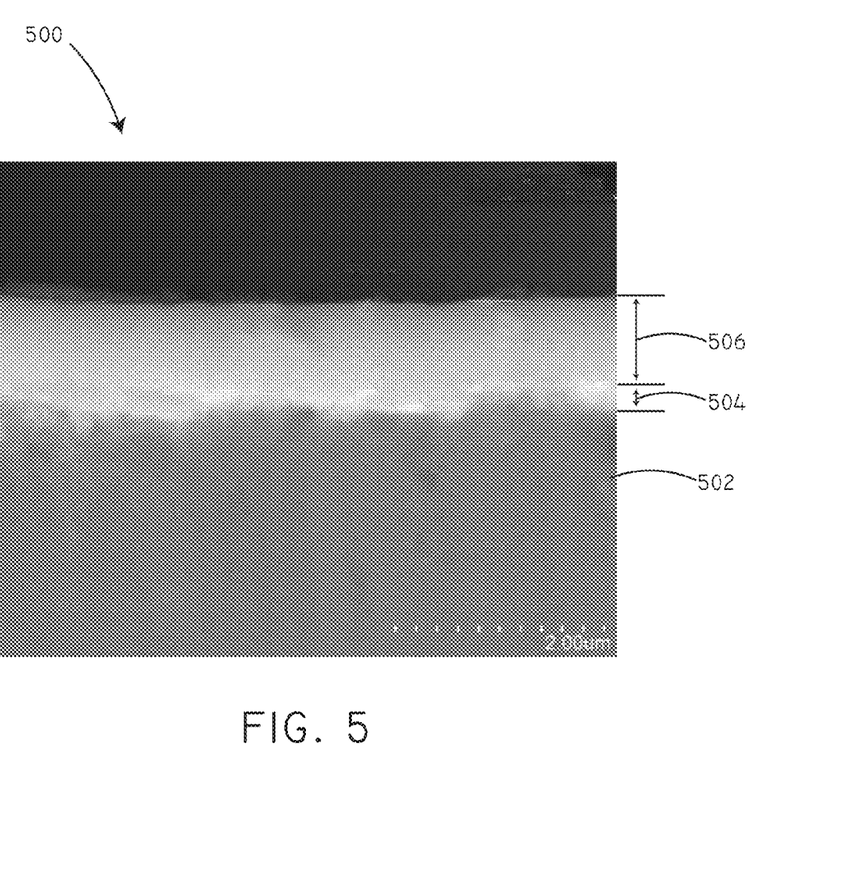
FIG. 5 is a cross-sectional micrograph of a coating on an aluminum substrate in accordance with an embodiment of the invention.

It was observed that there was no discoloration of the coated bar stock after 30 days. FIG. 5 shows a cross-sectional micrograph of the coated bar stock 500. A Zn/Fe film 504 having a thickness of between about 0.15 μm and 0.19 μm is shown deposited on the Al substrate 502. A Mo oxide film 506 having a thickness of between about 0.85 μm and about 0.9 μm is shown deposited on the Zn/Fe film 504.

A similar bar stock piece was cleaned and deoxidized under the conditions noted above, but treated using the zincate and molybdate baths with compositions shown in Tables 3 and 4 above respectively. This comparison bar stock piece acquired a gold color initially rather than black.

Example 6

Aluminum Bar Stock (6061 Alloy)

A piece of aluminum bar stock (6061 Alloy) was obtained and alkaline cleaned in an alkaline detergent bath to remove light soil and rinsed with clean water.

The bar stock was then immersed for about 2 minutes at room temperature in a etch-deoxidizer bath containing about 50% by volume nitric acid and about 2 grams per liter NH$_4$F, then rinsed with water.

The bar stock was then immersed for about 2 minutes at room temperature in a zincate bath containing the composition shown in Table 10 above. While immersed in the zincate bath, the bar stock acquired a light gray coating. The bar stock was then rinsed and immersed for about 4 minutes at about 200° F. in a bath having the composition shown in Table 12 below at a pH of about 6.5.

TABLE 12

| | |
|---|---|
| Ammonium dimolybdate | 50 grams per liter |
| Fluoroboric acid | 10 grams per liter |
| 2-amino-2-methyl-1-propanol | 30 grams per liter |

While immersed in the bath, the bar stock acquired a uniform black coating. The bar stock was then rinsed and wiped with a white paper towel. The bar stock exhibited no rub-off indicating a strongly adherent coating.

Example 7

Aluminum Roofing Nails

A small handful of 2"-aluminum vinyl siding nails are placed in a plastic mesh basket and alkaline cleaned and rinsed.

The basket of nails was immersed at room temperature for about 30 seconds in a zincate bath having the composition of Table 6 above. The basket of nails is periodically agitated. While immersed in the bath, the nails acquired a gray appearance. The basket of nails was then immersed for about 2 minutes at 190 degrees Fahrenheit in a molybdate bath having the composition of Table 7 above. The basket of nails is periodically agitated. While immersed in the bath, the nails acquired a uniform black appearance.

The basket of nails is rinsed with water and coated with water-displacing rust corrosion preventive oil (DRI-TOUCH™ Amber IRP2. Birchwood Laboratories, Eden Prairie, Minn.). The nails exhibited no rub-off when wiped with a white paper towel.

Example 8

Aluminum Panel (3003 Alloy)

An aluminum panel (3003 Alloy) was obtained and alkaline cleaned in an alkaline detergent bath to remove light soil and rinsed with clean water.

The panel was then immersed for 1 minute at room temperature in a zincate bath having the composition of Table 6 above. While immersed in the zincate bath, the mesh sample acquired a uniform gray appearance.

The panel is rinsed with water and immersed at room temperature for about 15 minutes in a molybdate bath according to Table 11 above. While immersed in the bath, the panel acquires a uniform black coating.

The panel was rinsed with water and sealed with a water-base urethane clear coat. With the clear coat, the panel acquired a smooth semi-gloss appearance.

A similar panel was treated with the zincate and molybdate baths of Tables 3 and 4 respectively. The panel initially had a uniform black coating. However, when coated with the urethane and allowed to dry, the panel immediately acquired a rough, blistered appearance, suggesting that some metal surface out-gassing had occurred.

Example 9

Aluminum Machined Block (6061 Alloy)

A machined aluminum block (6061 Alloy) is alkaline cleaned and rinsed to remove light soils.

The block was then immersed at room temperature for about 5 minutes in a bath consisting of about 1 pound per gallon of a mixture of sodium acid bisulfate, sulfamic acid, a fluoride salt, and a naphthalene sulfonate wetting agent (OXYPRIME® XP, Birchwood Laboratories, Eden Prairie, Minn.) then rinsed with water.

The block is immersed at room temperature for about 2 minutes in a stannate bath having a composition shown below in Table 13. The block was observed to develop a dark gray coating.

TABLE 13

| | |
|---|---|
| Sodium hydroxide | 40 grams per liter |
| Tin (II) oxide | 5 grams per liter |
| Iron (III) chloride | 2 grams per liter |
| Sodium nitrate | 5 grams per liter |
| Potassium sodium tartrate | 10 grams per liter |
| Sodium gluconate | 6 grams per liter |
| Sodium molybdate | 2 grams per liter |

The block was then rinsed and immersed at about 200 F for about 10 minutes in a molybdate bath having a composition as shown in Table 11.

The block was then rinsed with water and coated with a water-displacing rust preventive oil (DRI-TOUCH™ Amber IRP2. Birchwood Laboratories, Eden Prairie, Minn.). The block was then wiped with a white paper towel and exhibited no rub-off.

Example 10

Aluminum Alloy Stampings (5052 Alloy)

About 1 pound of L-shaped 5052 aluminum stampings were placed in a perforated polyethylene barrel and rotated at about 2 rpm in an alkaline cleaner for about 10 minutes to remove light stamping oil.

The barrel of stampings was immersed in water while rotating for about 2 minutes. The barrel of stampings was then immersed and rotated within a zincate solution at room temperature having the composition of Table 9 above.

The barrel of stampings was then immersed while rotating in a water rinse for about 2 minutes. An inspection of the stampings following the rinse indicated a uniform gray coating.

The barrel of stampings was immersed at about 150° F. for about 5 minutes while rotating in a molybdate bath having the composition shown in Table 8 above. While immersed in the bath the stampings acquired a uniform black appearance.

The barrel of stampings was then immersed while rotating in a water rinse for about 2 minutes. An inspection of the stampings following rinsing indicated a uniform and adherent black coating.

Example 11

Cast Aluminum Alloy Carpenter's Square

A cast aluminum carpenter's square was alkaline cleaned and rinsed to remove light soils. The piece was then immersed at room temperature for about 5 minutes in a bath consisting of about 1 pound per gallon of a mixture of sodium acid bisulfate, sulfamic acid, a fluoride salt, and a naphthalene sulfonate wetting agent (OXYPRIME® XP, Birchwood Laboratories, Eden Prairie, Minn.) then rinsed with water.

The piece was immersed at room temperature for about 2 minutes in a zincate bath having the composition described in Table 6 above.

The piece was then immersed at room temperature for about 2 minutes in a stannate bath having the composition described in Table 13 below.

TABLE 13

| | |
|---|---|
| Sodium hydroxide | 40 grams per liter |
| Tin (II) oxide | 5 grams per liter |
| Iron (III) chloride | 2 grams per liter |
| Sodium nitrate | 5 grams per liter |

TABLE 13-continued

| | |
|---|---|
| Potassium sodium tartrate | 10 grams per liter |
| Sodium gluconate | 6 grams per liter |
| Sodium molybdate | 2 grams per liter |

While immersed in the stannate bath, a dark gray coating developed on the piece. The piece was then rinsed and immersed at about 200 F for about 10 minutes in the molybdate bath having a composition as shown in Table 11 above.

The piece was rinsed with water and then coated with water-displacing rust preventive compound (SHEATH® WS 12. Birchwood Laboratories, Eden Prairie, Minn.). When wiped with a white paper towel, coating exhibited no rub-off.

Example 12

A 356-T6 Cast Aluminum Gear Housing

A gear housing was alkaline cleaned and rinsed to remove light process oil. The housing was immersed at room temperature for about 10 minutes in an acid-etch bath cited in Example 9 and rinsed with clean water.

The housing was immersed at room temperature for about 10 minutes in a zincate bath having the composition shown in Table 10 above and then rinsed with clean water. While immersed in the bath, the housing acquired a uniform light gray color.

The housing was then immersed at about 190° F. for about 10 minutes in a molybdate bath having the composition shown in Table 2 above and rinsed with clean water. While immersed in the bath, the housing acquired a uniform black appearance.

The housing was rinsed with clean water and when wiped with a white paper towel exhibited no rub-off. The housing was force-air dried and received no topcoat or sealant.

Example 13

Aluminum Tube (6063 Alloy)

A section of an aluminum tube (6063 alloy) was cleaned by abrasive blasting. The tube was then alkaline cleaned and rinsed to remove light surface particulate matter.

The tube was then immersed at room temperature for about 10 minutes in a zincate bath having the composition described in Table 10 and rinsed with clean water. While immersed in the bath, the tube acquires a uniform gray appearance.

The tube was then immersed for about 10 minutes at about 200° F. in a molybdate bath having the composition described in Table 2 and rinsed with clean water. While immersed in the bath, the tube acquires a black appearance.

The tube was then immersed in a water-displacing oil, and when wiped with a clean white paper towel, exhibited no rub-off.

Example 14

Molybdate Bath Life

A study was undertaken comparing the bath life without replenishment of the Paulet '628 molybdate coloring solution with that of embodiments herein. Testing was conducted on pre-cleaned 3×6 inch 3003 aluminum panel stock until the molybdate failed to produce a uniform black color. At this point, the total square footage of aluminum processed was recorded. Side-by-side tests were performed using the zincate pretreatments and molybdate coloring solutions described in the Paulet '628 patent and this invention. Process parameters are detailed as follows:

TABLE 14

| Paulet '628 Zincate | | Present Zincate | |
|---|---|---|---|
| Component | Amount wt. % | Component | Amount wt. % |
| Iron (III) chloride | 0.2 | Iron (III) chloride | 0.2 |
| Potassium sodium tartrate | 5.0 | Potassium sodium tartrate | 10.0 |
| Sodium nitrate | 0.1 | Sodium nitrate | 0.5 |
| Sodium hydroxide | 5.0 | Sodium hydroxide | 5.5 |
| Zinc oxide | 2.0 | Zinc oxide | 1.0 |
| | | Sodium gluconate | 0.6 |

Zincate immersion time was 30 seconds per panel at room temperature. Each panel then received a 30 second rinse after immersion in the zincate and before molybdate treatment.

TABLE 15

| Paulet '628 Molybdate | | Present Molybdate | |
|---|---|---|---|
| Component | Amount wt. % | Component | Amount wt. % |
| Ammonium heptamolybdate | 5.0 | Ammonium heptamolybdate | 5.0 |
| Ammonium fluoroborate | 1.5 | Fluoroboric acid | 1.5 |
| Triethanolamine | 8.0 | 2-amino-2-methyl-1-propanol | 3.0 |

Molybdate immersion time was 4 minutes per panel at 200 F per panel. It was determined that the Paulet '628 compositions could treat 26.5 ft$^2$ of aluminum per gallon of solution whereas the compositions in accordance with embodiments herein (present molybdate solutions) could treat 30.28 ft$^2$ of aluminum per gallon of solution. This study was repeated with almost identical results, indicating a 14% increase molybdate bath life with embodiments of the invention.

The invention has been described with reference to various specific and preferred embodiments and techniques. However, it should be understood that many variations and modifications may be made while remaining within the spirit and scope of the invention.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference. Nothing herein is to be construed as an admission that the inventors are not entitled to antedate any publication and/or patent, including any publication and/or patent cited herein.

The invention claimed is:

1. A kit for applying a coating exhibiting black color stability for a period of 60 days to an aluminum substrate, the kit comprising:
   a first solution comprising
      at least about 2 grams per liter of a zinc metal salt;
      at least about 2 grams per liter of a sugar acid selected from the group consisting of gluconic acid, glucoheptonic acid, and alkali metal salts thereof;
      at least about 20 grams per liter of an alkali metal hydroxide; and
   a second solution comprising
      at least about 20 grams per liter of a molybdate salt;
      at least about 10 grams per liter of an alkanolamine; and
      at least about 2 grams per liter of a fluorine acid.

2. The kit of claim 1, the first solution further comprising at least about 0.5 grams per liter of an iron metal salt;
   at least about 2 grams per liter of a carboxylic acid or alkali metal salt thereof; and
   at least 1 gram per liter of an oxidizing agent.

3. A composition for applying a coating exhibiting black color stability for a period of 60 days on an aluminum substrate the solution comprising:
   at least about 2 grams per liter of a zinc metal salt;
   at least about 0.5 grams per liter of an iron metal salt;
   at least about 2 grams per liter of a carboxylic acid or alkali metal salt thereof;
   at least about 2 grams per liter of a sugar acid selected from the group consisting of gluconic acid, glucoheptonic acid, and alkali metal salts thereof;
   at least about 20 grams per liter of an alkali metal hydroxide; and
   at least about 1 gram per liter of an oxidizing agent.

4. The kit of claim 1, the first solution further comprising:
   an iron metal salt,
   a carboxylic acid or alkali metal salt thereof, and
   an oxidizing agent.

5. The kit of claim 1, the zinc metal salt comprising zinc (II) oxide.

6. The kit of claim 4, the iron metal salt comprising an iron (III) salt.

7. The kit of claim 6, the iron (III) salt comprising $FeCl_3$.

8. The kit of claim 2, the carboxylic acid selected from the group consisting of glycolic acid, malic acid, tartaric acid, and citric acid.

9. The kit of claim 2, the carboxylic acid or alkali metal salt thereof comprising one or more of sodium tartrate, potassium tartrate, and sodium-potassium tartrate.

10. The kit of claim 1, the alkali metal hydroxide selected from the group consisting of sodium hydroxide, potassium hydroxide, and lithium hydroxide.

11. The kit of claim 2, the oxidizing agent comprising an alkali metal nitrate.

12. The kit of claim 1, the molybdate salt comprising ammonium heptamolybdate.

13. The kit of claim 1, the alkanolamine selected from the group consisting of monoethanolamine, triethanolamine, and 2-amino-2-methyl-1-propanol.

14. The kit of claim 1, the alkanolamine comprising 2-amino-2-methyl-1-propanol.

15. The kit of claim 1, the fluorine acid selected from the group consisting of fluoroboric acid and fluorosilicic acid.

\* \* \* \* \*